United States Patent
Fox

(10) Patent No.: US 6,857,614 B2
(45) Date of Patent: Feb. 22, 2005

(54) POST/WALL FLAG HOLDER

(76) Inventor: Steven Alfred Fox, 2373 Boxwell Rd., Prospect, OH (US) 43342

( * ) Notice: Subject to any disclaimer, the term of this patent is extended or adjusted under 35 U.S.C. 154(b) by 67 days.

(21) Appl. No.: 10/295,607

(22) Filed: Nov. 15, 2002

(65) Prior Publication Data

US 2003/0098404 A1 May 29, 2003

Related U.S. Application Data

(60) Provisional application No. 60/333,006, filed on Nov. 26, 2001, provisional application No. 60/349,284, filed on Jan. 17, 2002, and provisional application No. 60/333,061, filed on Nov. 26, 2001.

(51) Int. Cl.$^7$ ............................................. A01K 97/10
(52) U.S. Cl. ...................................... 248/535; 248/538
(58) Field of Search ................................ 248/538, 520, 248/314, 535, 539, 541; 116/173

(56) References Cited

U.S. PATENT DOCUMENTS

| | | | | |
|---|---|---|---|---|
| 1,053,255 A | * | 2/1913 | Ward | .......................... 248/536 |
| 3,920,207 A | * | 11/1975 | Adamaitis | .................... 248/538 |
| 4,712,870 A | * | 12/1987 | Robinson et al. | ............ 359/738 |
| 5,252,608 A | * | 10/1993 | Palfreyman et al. | ........ 514/651 |
| 5,335,621 A | * | 8/1994 | Willis et al. | ................. 116/173 |
| 5,524,856 A | * | 6/1996 | Neely et al. | ................. 248/534 |
| 5,561,937 A | * | 10/1996 | Johnson | ...................... 43/21.2 |
| 5,568,784 A | * | 10/1996 | Willis et al. | ................. 116/173 |
| RE35,731 E | * | 2/1998 | Lach | .......................... 248/535 |
| 5,829,731 A | * | 11/1998 | Dean | .......................... 248/538 |
| 6,726,170 B2 | * | 4/2004 | Luo | ........................... 248/538 |
| 6,742,757 B2 | * | 6/2004 | Fox | ............................ 248/538 |
| 2002/0179804 A1 | * | 12/2002 | Graves et al. | |

* cited by examiner

*Primary Examiner*—Ramon O Ramirez

(57) ABSTRACT

The post/wall flag holder is a one-piece molded plastic holder used to display smaller flags, banners or pennants on posts and walls for decorative purposes. The flag holder displays smaller flags, banners or pennants at a forty-five (45) degree angle. The flag holder can be attached to wood with screws or to finished surfaces with double-sided adhesive mounting tape and/or Velcro™ (a trademark for a hook and loop fastening system).

6 Claims, 5 Drawing Sheets

SIDE VIEW

FRONT VIEW

TOP VIEW

SIDE VIEW

BACK VIEW

POST/WALL FLAG HOLDER

CROSS-REFERENCE TO RELATED APPLICATIONS

This application claims the benefit of U.S. Provisional Patent Applications Ser. No. 60/333,006, filed Nov. 26, 2001, titled "Post clip", and U.S. Ser. No. 60/349,284, filed Jan. 17, 2002, titled "Wall clip", which are now being combined onto one application. A related application is U.S. Provisional Patent Application Ser. No. 60/333,061, filed Nov. 26, 2001 and titled "Fence clip."

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates generally to flag accessories, holders and brackets, and more particularly, to a one-piece molded plastic holder used to display smaller size flags, banners or pennants on wood posts, fences, interior or exterior walls or smooth surfaces and fabric coated partitions. During festive times and national holidays, it is desirable to display flags of many sorts. There are many various patents for flag holding devices, but most are for the standard 3'x5' or 4'x6' flags and have not focused on the smaller flags, banners or pennants such as the memorial size flag (12"x16") or smaller. The standard size flags and flag holders look out of place when used on fence posts or mailbox posts, as they are too large. Many people have attempted to attach smaller flags to these applications with duct tape, or by other means which are not aesthetically pleasing. The post/wall flag holder is designed to display the smaller flags for decorative purposes.

Various patents have proposed different methods of displaying flags by attaching them to flat surfaces, by means of drilling holes into the surface and attaching with screws or other fasteners. U.S. Pat. No. Re. 35,731 to Lach, describes a flag pole bracket which must be attached to a flat surface by means of screws. U.S. Pat. No. 5,524,856 to Neely & Shriner describes a rail bracket flag holder, but this application merely provides a base to attach a conventional flag holder with bolts and wing nuts. Other previous patents for flag holders include U.S. Pat. No. 466,960 to Bert & Widmayer, U.S. Pat. No. 1,053,255 to Ward, U.S. Pat. No. 1,198,840 to Hanck & David, U.S. Pat. No. 1,632,726 to Conklin, and U.S. Pat. No. 2,914,278 to Burke. A flagpole assembly, U.S. Pat. No. 5,253,608 to Burke also requires a bracket to be attached with screws to the desired surface.

U.S. Pat. No. 3,920,207 to Adamaitis describes a flag holder attached to a pole or a tree by means of straps. U.S. Pat. No. 5,377,944 to Getsinger describes a system for displaying flags on a post, but the placement is required to be at the top of the post. The present invention post/wall flag holder is more versatile in its application than any of these previous designs, as well as having a non-obtrusive appearance during the time a flag is not inserted. It has pre-cast pilot holes which can be drilled out for application to wood surfaces with screws, or it can be attached to smooth surfaces with double sided adhesive mounting tape, or to fabric coated surfaces with Velcro™ hook and loop fastening system.

BRIEF SUMMARY OF THE INVENTION

The present invention is a holder used to display smaller sized flags, banners or pennants on wood, smooth and fabric coated surfaces for decorative purposes. It is a further objective of the present invention to provide a post or wall flag holder that is easy to use, stable, durable and reliable. It is a further objective of the present invention to be made of one-piece molded (ABS) durable plastic material which is aesthetically pleasing and simple in appearance and which will last for years of use. The post/wall flag holder can be produced in various colors to match the different colors of surfaces.

DETAILED DESCRIPTION OF THE INVENTION

A. Overview

Figure 1:
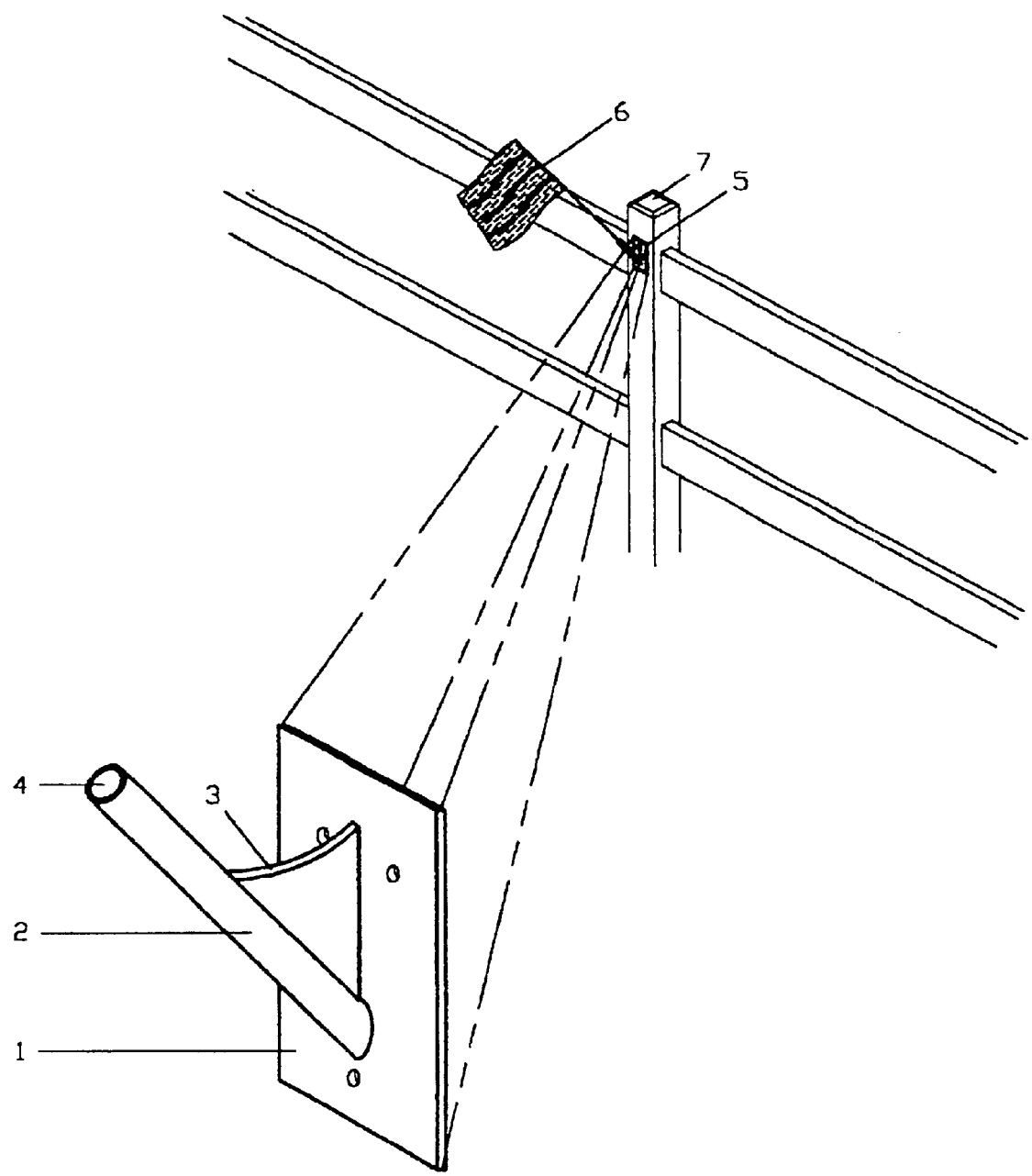
FIG. 1 is a three-dimensional perspective view of the one-piece molded plastic flag holder on a post of a wood fence.

FIG. 1 illustrates a complete perspective 3-dimensional overall view of the post/wall flag holder 5 as attached to a wood post 7. The application of this flag holder can also be used on smooth surfaces such as walls or partitions, or fabric covered surfaces such as partitions used in offices. It depicts the vertical support surface plate 1 of the flag holder 5 with the flag shaft 6 holding angled smooth-bored tube 2 attached by the support brace 3 to the face of the vertical support surface plate 1 of the post/wall flag holder 5. FIG. 1 also shows the three (3) holes which were drilled for the placement of screws for the attachment of the flag holder 5 on wood surfaces 7.

B. Structure

The post/wall flag holder is tooled and died for a solid one-piece (ABS-Acrylonitrile Butadiene Styrene) plastic injection mold. There are many other types of materials that could be used which would generate the same form, fit and function , but not necessarily the same durability. The injection mold process uses raw plastic material which is heated in a chamber until it reaches its melting point. It is then injected into a mold where it is allowed to cool to become solid and then it is ejected from the mold.

Figure 2:
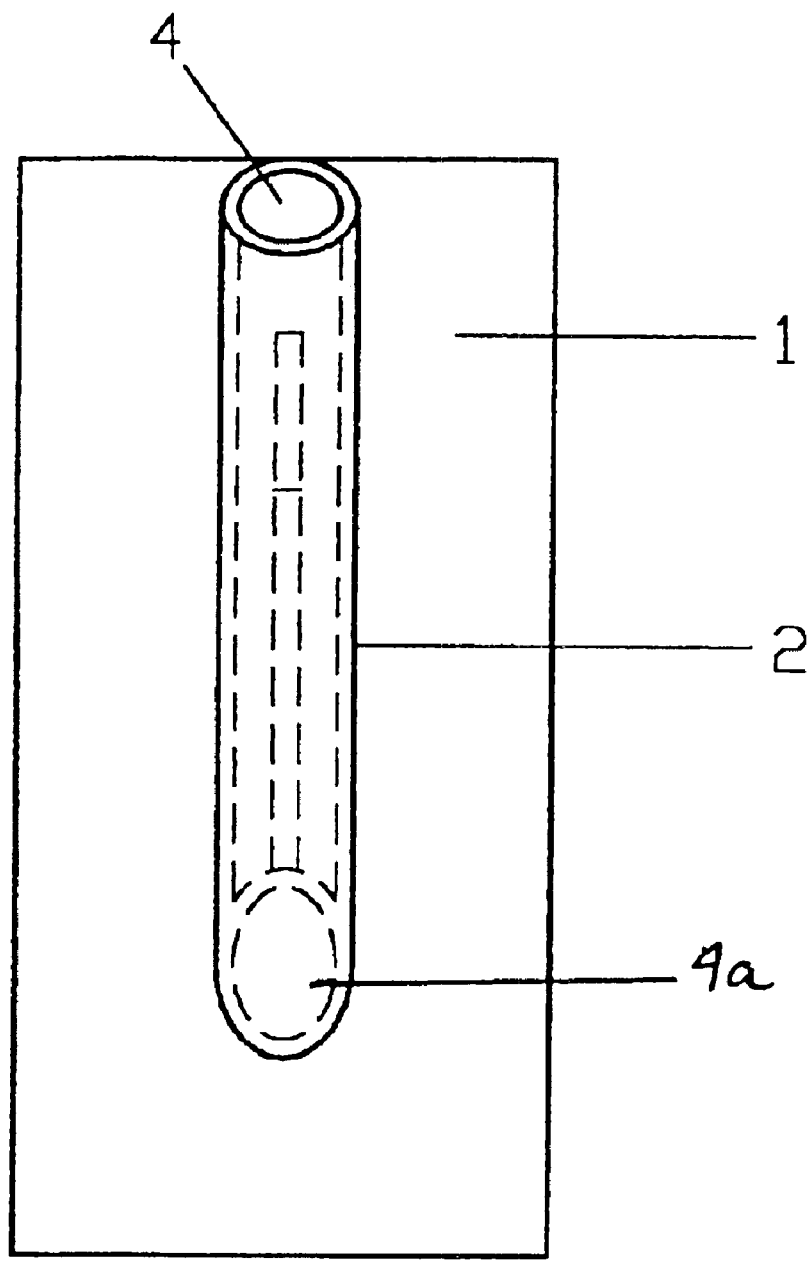
FIG. 2 is a front view showing the tube which holds the wood dowel shaft of a flag, banner or pennant attached to the vertical support surface plate.

FIG. 2 illustrates a preferred embodiment of the front view of the post/wall flag holder showing the vertical support surface plate 1 and an angled smooth-bored tube 2 with a through hole 4 for holding a flag shaft 6, the through hole 4 extrudes all the way through the front vertical support surface plate 1 at the bottom portion of the surface of the front vertical support surface plate 1 and forms opening 4a to allow moisture to exit.

Figure 3:
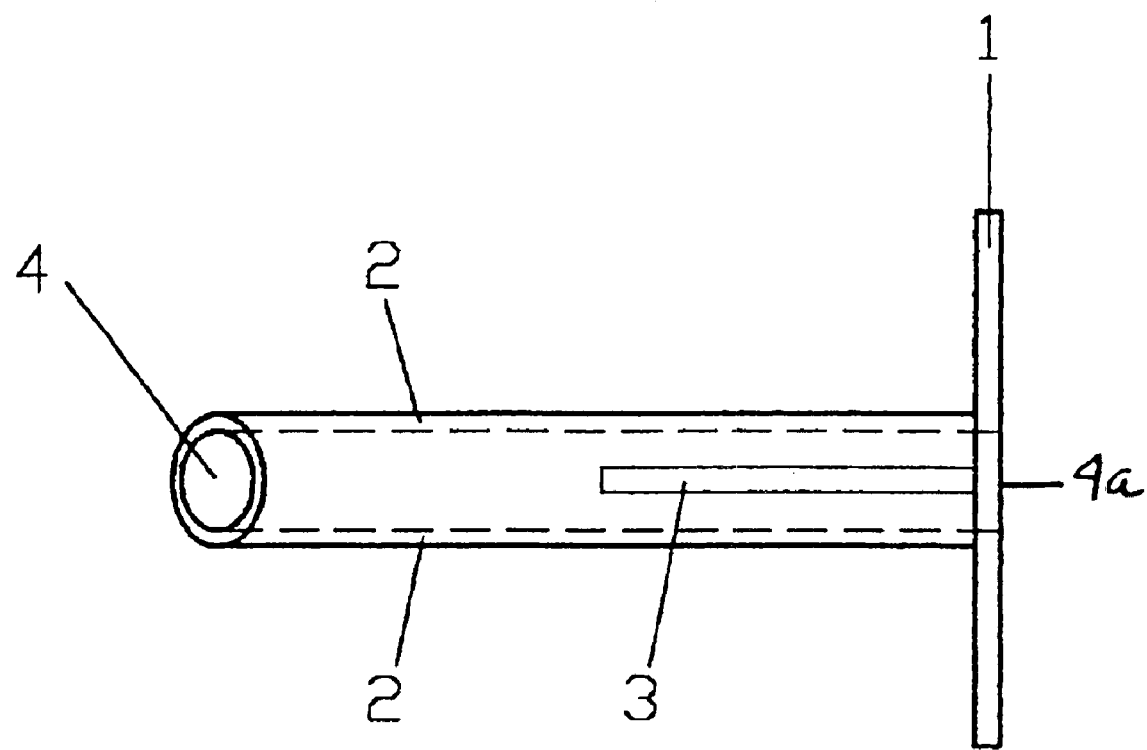
FIG. 3 is a top perspective view looking down upon the vertical support surface plate of the one-piece molded plastic flag holder. It shows the flag shaft holding tube with its support brace. It also shows the double sided adhesive mounting tape and/or Velcro™ slots and the pre-cast pilot holes.

FIG. 3 illustrates a preferred embodiment of the top perspective view looking down upon the post/wall flag holder. The view shows the flag holder with the angled smooth-bored tube 2 with a through hole 4, the through hole 4 extrudes all the way through the front vertical support surface plate 1 and forms opening 4a to allow moisture to exit. It also shows the support brace 3 attached to the angled smooth-bored tube 2 and the vertical support surface plate 1.

Figure 4:
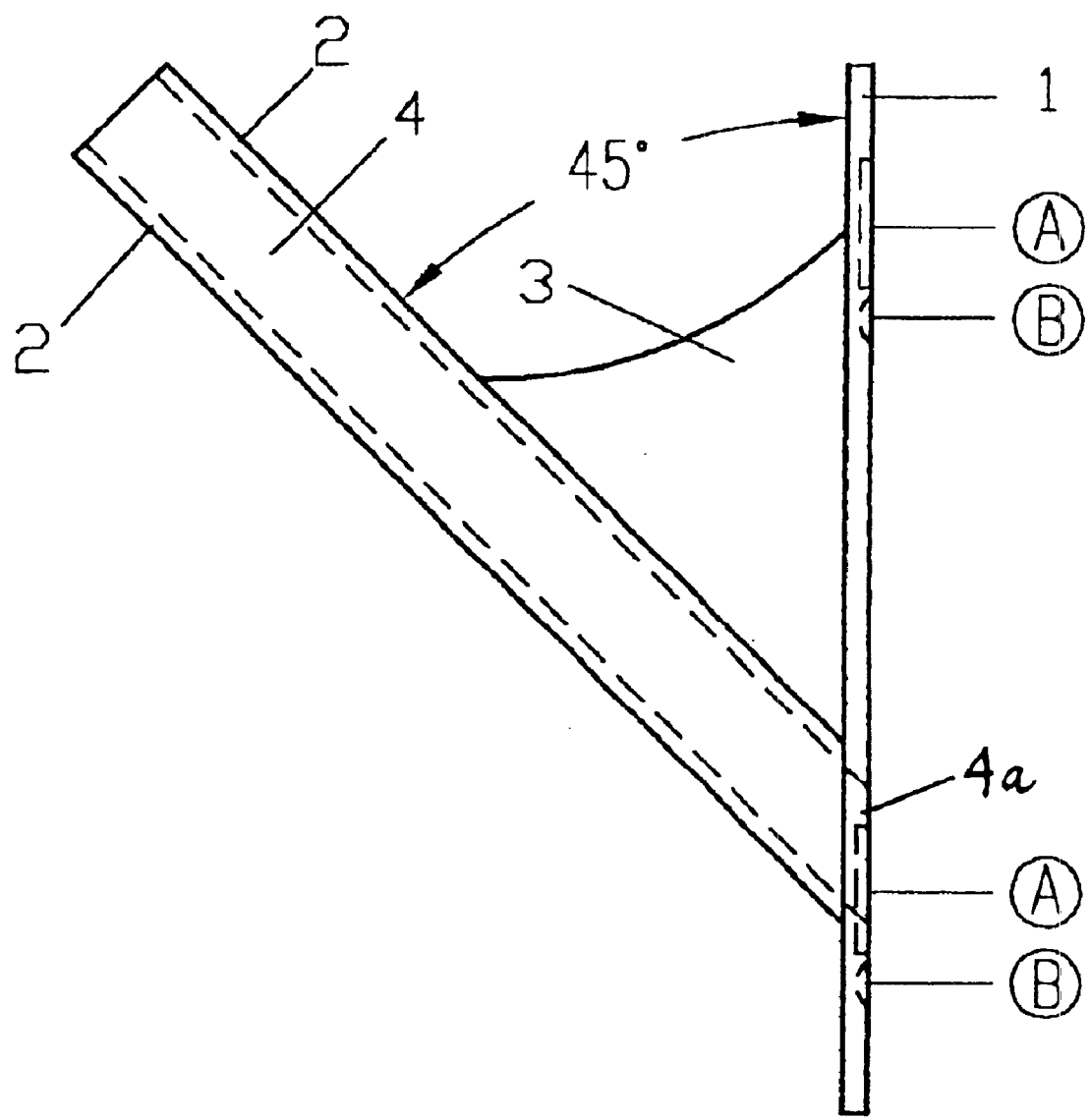
FIG. 4 is a side view of the one-piece molded plastic flag holder showing the flag shaft tube holder and the support brace which attaches to the vertical support surface plate. It also shows the placement of the two (2) double-sided adhesive mounting tape and/or Velcro™ A; and the pre-cast pilot holes on the back of the vertical support surface plate B

FIG. 4 illustrates a preferred embodiment of the side view of the post/wall flag holder. It shows the angled smooth-bored tube 2, having walls of solid construction, with a through hole 4 which holds the flag shaft 6 and extrudes all the way through the front vertical support surface plate 1 and forms opening 4a to allow moisture to exit. It also illustrates the support brace 3 connecting the flag shaft holding tube 2 to the vertical support surface plate 1 at a forty-five (45) degree angle from the tube 2 to the vertical support surface plate 1. It also shows the concave top edge of the support brace 3 forming a bridge between the vertical support surface plate 1 and the angled smooth-bored tube 2. The post/wall flag holder 5 is to be approximately ⅛ inch thick.

Figure 5:
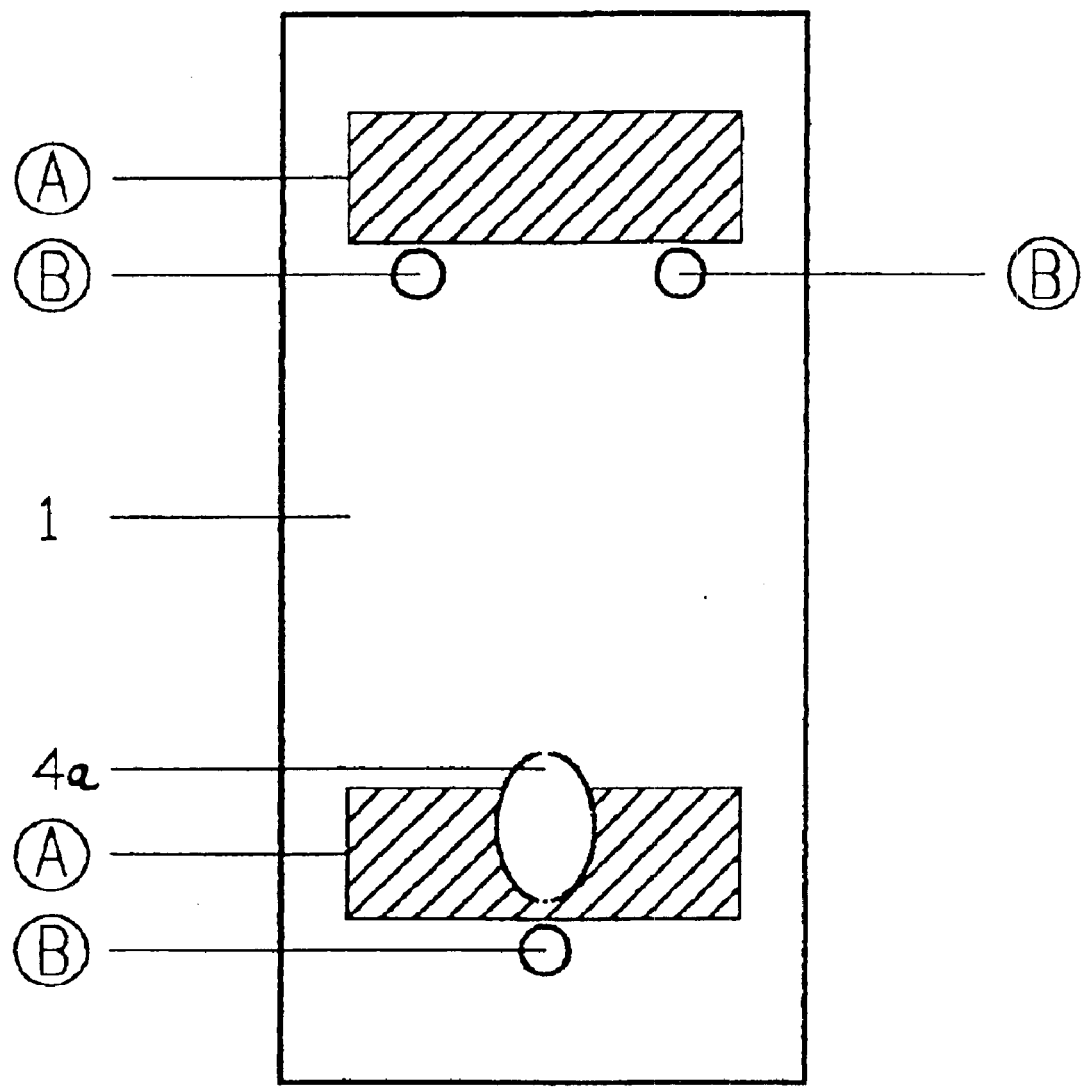
FIG. 5 is the perspective view of the back of the vertical support surface plate of the one-piece molded plastic flag holder showing the two (2) double-sided adhesive mounting tape A for anchoring the flag holder to smooth surfaces, or for Velcro™ hook and loop fastening system for anchoring the flag holder to fabric covered surfaces; and the three (3) pre-cast pilot holes for anchoring the flag holder to a wood surface.

FIG. 5 illustrates a preferred embodiment of the back view of the post/wall flag holder. A shows the placement of two molded rectangular slots for the insertion of adhesive mounting tape and/or hook and loop fastening system. B shows the placement of the three (3) pre-cast pilot holes.

FIG. 5 also shows the through hole 4 forming opening 4a which allows moisture to exit.

What is claimed, as being new and desired to be protected by Letters Patent of the United States is as follows:

1. A flag holder for mounting flags, banners or pennants, sized smaller than 12 inches by 16 inches, intended to be mounted on a free standing post or fence post, and on a flat surface, said holder comprising:

an integral molded plastic piece having a vertical support surface plate and a smooth bored tube extending at an angle from said plate, said tube having solid walls along its length defining a through hole to receive a shaft of a flag, banner or pennant, said through hole extending through a bottom portion of the vertical support plate defining an opening in said plate to allow moisture to exit, said plate being of one solid piece except for the area of said opening; and a generally concave support brace formed between the tube and the vertical support surface plate.

2. The flag holder recited in claim 1, wherein a back side of the vertical support plate further comprises two molded rectangular slots to receive fastening means.

3. The flag holder recited in claim 2, wherein the fastening means is a double side adhesive tape.

4. The flag holder recited in claim 2, wherein the fastening means is a hook and loop strip.

5. The flag holder recited in claim 2, wherein a back side of said vertical support plate further comprises three pre-cast pilot holes.

6. The flag holder recited in claim 1, wherein a back side of said vertical support plate further comprises three pre-cast pilot holes.

* * * * *